United States Patent
Goodson et al.

(10) Patent No.: US 10,025,599 B1
(45) Date of Patent: Jul. 17, 2018

(54) CONNECTIVITY AS A SERVICE

(71) Applicant: Progress Software Corporation, Bedford, MA (US)

(72) Inventors: John Goodson, Morrisville, NC (US); Michael Benedict, Morrisville, NC (US); Robert Steward, Winston-Salem, NC (US); Mark Biamonte, Apex, NC (US); Marc Van Cappellen, Meise (BE); Steven Veum, Morrisville, NC (US)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 14/173,727

(22) Filed: Feb. 5, 2014

Related U.S. Application Data

(60) Provisional application No. 61/825,744, filed on May 21, 2013, provisional application No. 61/891,290, filed on Oct. 15, 2013.

(51) Int. Cl.
| | | |
|---|---|---|
| *G06F 3/00* | (2006.01) | |
| *G06F 9/44* | (2018.01) | |
| *G06F 9/46* | (2006.01) | |
| *G06F 13/00* | (2006.01) | |
| *G06F 9/4401* | (2018.01) | |
| *G06F 9/50* | (2006.01) | |

(52) U.S. Cl.
CPC ............ *G06F 9/4411* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 8,447,871 B1 * | 5/2013 | Szabo | H04L 12/26 709/225 |
| 9,390,298 B2 * | 7/2016 | Nguyen | H04W 4/008 |
| 2009/0049200 A1 * | 2/2009 | Lin | G06F 17/30569 709/246 |
| 2010/0011091 A1 * | 1/2010 | Carver | H04L 29/12594 709/219 |
| 2010/0242096 A1 * | 9/2010 | Varadharajan | H04L 63/029 726/4 |
| 2011/0153822 A1 * | 6/2011 | Rajan | H04L 67/14 709/225 |
| 2013/0219468 A1 * | 8/2013 | Bell | H04L 63/10 726/4 |

* cited by examiner

*Primary Examiner* — Diem Cao
(74) *Attorney, Agent, or Firm* — Patent Law Works LLP

(57) ABSTRACT

A system and method for providing connectivity as a service are disclosed. In one embodiment, the system establishes a connection between a driver and a connectivity service; receives, at the connectivity service, a request from the driver; establishes a connection with one or more data sources associated with the request; and sends the request to the one or more data sources, the one or more data sources performing an action based on the request.

20 Claims, 8 Drawing Sheets

CONNECTIVITY AS A SERVICE

CROSS-REFERENCE TO RELATED APPLICATIONS

The present application claims priority, under 35 U.S.C. § 119, of U.S. Provisional Patent Application No. 61/825,744, filed May 21, 2013 and entitled "DataDirect Cloud," and of U.S. Provisional Patent Application No. 61/891,290, filed Oct. 15, 2013 and entitled "On-Premise Data Access and Firewall Tunneling," the entirety of both are hereby incorporated by reference.

FIELD OF INVENTION

The present disclosure relates to connecting to data sources. Specifically, providing connectivity as a service to one or more data sources.

BACKGROUND

As the amount of data created and collected has increased, the data access landscape has changed. The number and types of data sources has increased rapidly. This has resulted in a rapid increase in the number of Application Program Interfaces (APIs) for providing access to data stored in such sources. Additionally, the average number of data sources a user interacts with, sometimes when using a single application, is also increasing. Due in part to these developments, data source connectivity is increasingly important.

A problem is that costs and complexity of an application increase with the number of data sources used. Current systems may require an application to use multiple separate APIs and drivers to provide connectivity to multiple data sources; however, such point-to-point connectivity is brittle, uses many APIs, and the APIs may change quickly (which may make maintenance too costly). Present systems, therefore, fail to provide connectivity to multiple data sources that is relatively inexpensive, robust and easily maintained. Further present systems fail to provide a single driver that plugs into any third-party application suite to provide connectivity to any number of data sources. Additionally, present systems fail to provide SQL access to a broad spectrum of data sources through a cloud-based connectivity service.

SUMMARY

In general, an innovative aspect of the subject matter described in this disclosure may be embodied in methods that include establishing, using one or more processors, a connection between a driver and a connectivity service; receiving, using one or more processors, a request at the connectivity service from the driver; establishing, using one or more processors, a connection with a first set of one or more data sources associated with the request; and sending the request to the one or more data sources, the one or more data sources performing an action based on the request. Examples of actions may include, but are not limited to, fetching data from the data source, creating new data in the data source, updating existing data in the data source and fetching metadata describing the data in the data source.

According to another innovative aspect of the subject matter described in this disclosure, a system comprises a processor; and a memory storing instructions that, when executed, cause the system to: establish a connection between a driver and a connectivity service; receive, at the connectivity service, a request from the driver; establish a connection with one or more data sources associated with the request; and send the request to the one or more data sources, the one or more data sources performing an action based on the request.

According to yet another innovative aspect of the subject matter described in this disclosure, a system comprises a processor; and a memory storing instructions that, when executed, cause the system to: receive, at a driver, a request from an application; establish a connection between the driver and a connectivity service; send the request to the connectivity service, the connectivity service establishing a connection with one or more data sources associated with the request, the one or more data sources performing an action based on the request; and receive, at the driver, data from one or more data sources responsive to the request including a request for the data.

Other implementations of one or more of these aspects include corresponding systems, apparatus, and computer programs, configured to perform the actions of the methods, encoded on computer storage devices. These and other implementations may each optionally include one or more of the following features.

For instance, the operations further include receiving data from one or more data sources; and sending the received data to the driver, wherein the request includes a request for data received from the one or more sources and the action performed by the one or more data sources includes a query of the one or more data sources based on the request. For instance, the driver and connectivity service communicate using a wire protocol. For instance, the connection between the driver and connectivity service is stateless and the driver and connectivity service communicate using a wire protocol, the wire protocol including one or more tokens including state information. For instance, the driver and connectivity service communicate using a wire protocol, the wire protocol including a binary protocol, the binary protocol compressing, at the connectivity service, data received from the one or more data sources, wherein the received data sent to the driver is compressed data. For instance, the one or more data sources include a first data source and a second data source, wherein the first data source has a first type and the second data source has a second type different from the first type. For instance, the one or more data sources include a first data source and a second data source, wherein the first data source has a first class and the second data source has a second class different from the first class. For instance, the one or more data sources include a first data source and a second data source, wherein the first data source has a first class and the second data source has a second class different from the first class, wherein the first and second class are each one of a big data source, a social network source, a relational source, a NoSQL source, a customer engagement source, a business operations source and an other source. For instance, the operations further include setting a first timer, at the connectivity service, responsive to receiving the request, wherein the request includes a request for data; determining, at the connectivity service, whether at least a portion of the requested data has been received prior to an expiration of the timer; responsive to determining that at least a portion of the requested data has been received, sending the at least a portion of the requested data and resetting the first timer; and responsive to determining that at least a portion of the requested data has not been received, sending a continuation message without the requested data and resetting the first timer; wherein the sending of the continuation message without the requested data and the sending of at least a portion of the requested data resets a second timer at a load balancer, the second timer associated with a timeout period for the load balancer. For instance, the connectivity service simultaneously is connected to another driver for receiving data requests from the another driver and sending, to the another driver, data requested by the another driver and received, by the connectivity service, from a second set of one or more data sources.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
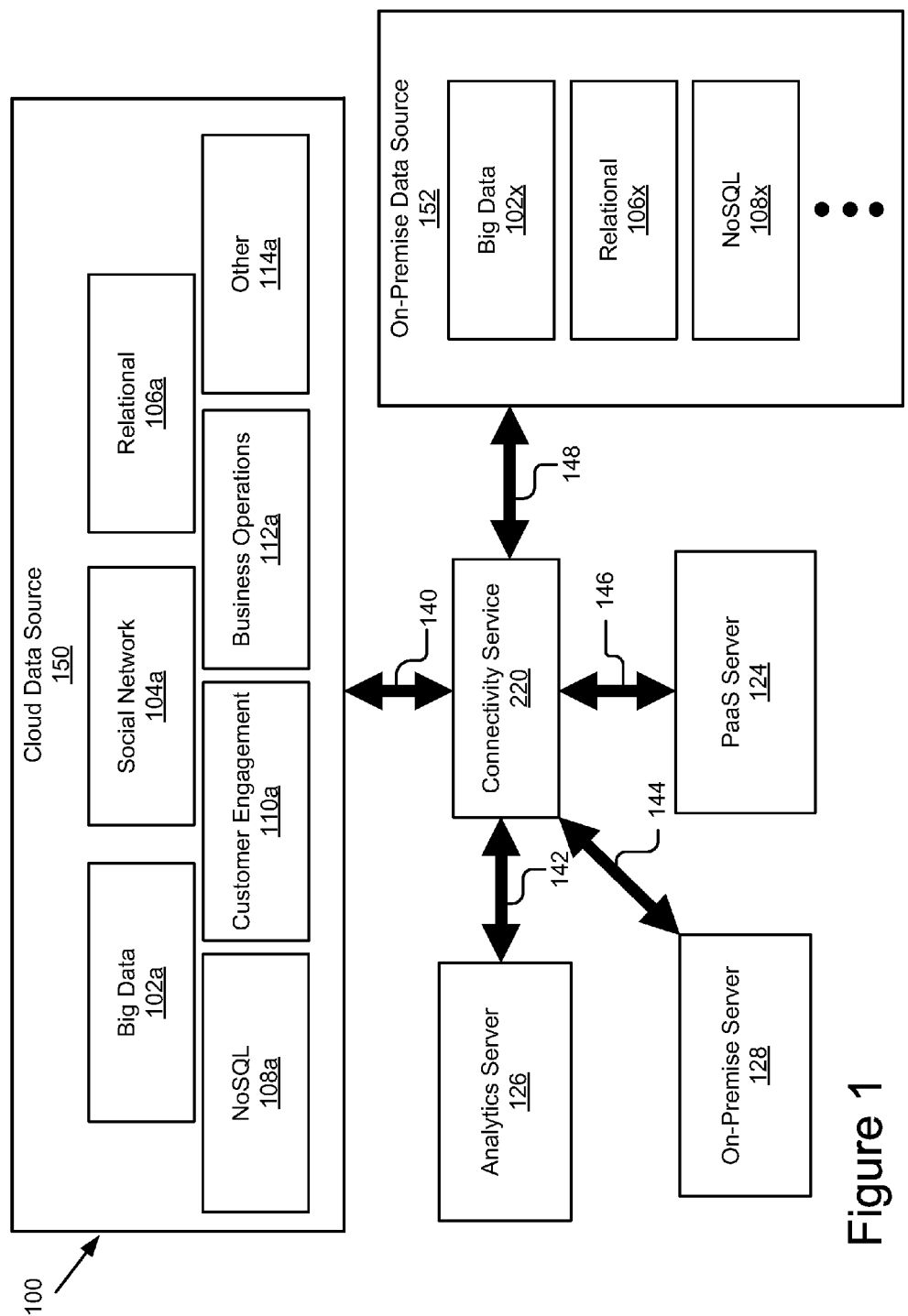
FIG. 1 is a block diagram illustrating an example of a connectivity as a service according to one embodiment.

FIG. 1 is a block diagram illustrating an example of connectivity as a service according to one embodiment. The disclosure herein describes a cloud-based connectivity service 220, which may provide connectivity to one or more types of data sources which may include a cloud data source 150 (e.g. a big data 102a, a social network 104a, a relational 106a, a not only structured query language (NoSQL) 108a, a customer engagement 110a, a business operations 112a source and an other 114a source) and/or an on-premise data source 152 (e.g. a big data source 102x, a relational data source 106x, a NoSQL data source 108x, etc.), with an analytics server 126 (e.g. providing live analytics), an on-premise server 128 (e.g. providing an on-premise application and/or database) and a Platform as a Service (PaaS) server 124 (e.g. providing cloud-based platforms) as represented by signal lines 140, 148, 142, 144, 146, respectively.

While FIG. 1 illustrates one cloud data source 150, one on-premise data source 152, one analytics server 126, one on-premise server 128 and one PaaS server 124, the present specification applies to any system architecture having any number of cloud data sources 150, on-premise data sources 152, analytics servers 126, on-premise servers 128 and PaaS servers 124. For example, in one embodiment, the connectivity service 220 connects a first cloud data source 150 to a first analytics server 126; connects a first on-premise data source 152, second cloud data source 150 and third cloud data source 150 to a first on-premise server 128; and connects a second on-premise data source 152 to a second analytics server 126 and a PaaS server 124.

In addition to providing connectivity to different types of data sources 150, 152, in one embodiment, the connectivity service 220 provides connectivity to different classes associated with a data source type. For example, the illustrated embodiment shows big data 102a sources, social network 104a sources, relational 106a sources, NoSQL 108a sources, customer engagement 110a sources, business operations 112a sources and other 114a sources as classes of cloud data sources 150 and big data 102x sources, relational 106x sources, NoSQL 108a sources, etc. as classes of on-premise data sources 152. It should be noted that the classes illustrated in FIG. 1 are illustrative and not exhaustive and that other classes exist that may be associated with a cloud data source 150 and/or on-premise data source 152. It should also be noted that, while FIG. 1 illustrates one cloud data source 150 and one on-premise data source 152, multiple cloud data sources 150 and/or multiple on-premise data sources 152 may be present, which may each be associated with a common or different class. For example, in one embodiment, the connectivity service 220 may provide connectivity to two NoSQL 120 cloud data sources 150. It should be further noted that, in some embodiments, a cloud data sources 150 or an on-premise data source 152 may be omitted from the system 100. For example, in one embodiment, the connectivity service 220 may provide connectivity to a NoSQL 120 cloud data source 150 and a relational 106 cloud data source 150, and an on-premise data source 152 may not be present in the system of such an embodiment.

Examples of big data 102 sources may include but are not limited to one or more of Hadoop, Hive, Amazon DynamoDB, Google Bigtable, etc. Examples of social network 104 sources may include but are not limited to one or more of Twitter, Facebook, Google+ and LinkedIn, etc. Examples of relational 106 sources may include but are not limited to one or more of Oracle, DB2, PostgreSQL, Enterprise DB, Microsoft SQL Azure, Amazon RDS, etc. Examples of NoSQL 108 sources may include but are not limited to one or more of Salesforce's database.com, Redis, Cassandra, MongoDB, CouchBase, HBase, Hive, Impala, etc. Examples of customer engagement 110 sources may include but are not limited to one or more of Sugar CRM, Right Now, Salesforce, Aprimo, Eloqua, Hubspot, Marketo, Microsoft Dynamics, Oracle RightNow, etc. Examples of business operations 112 sources may include but are not limited to one or more of SuccessFactors, Taleo, ADP, Workday, Intacct, Concur, NetSuite, Microsoft Dynamics, SAP Business by Design, QAD, Infor, etc. Examples of other 114 sources may include but are not limited to one or more of SAP HANA, Intuit, OData, etc. It should be recognized that the preceding are merely examples of various classes 102, 104, 106, 108, 110, 112, 114 of data sources and that other classes of data sources exist and may be used without departing from the disclosure herein. Additionally, it should be recognized that the examples given in each class of data source are illustrative and not exhaustive.

The PaaS server 124 may include one or more computing devices having data processing, storing, and communication capabilities. For example, the PaaS server 124 may include one or more hardware servers, server arrays, storage devices, systems, etc., and/or may be centralized or distributed/ cloud-based. In some implementations, the PaaS server 124 may include one or more virtual servers, which operate in a host server environment and access the physical hardware of the host server including, for example, a processor, memory, storage, network interfaces, etc., via an abstraction layer (e.g., a virtual machine manager).

In one embodiment, the PaaS server 124 provides a platform as a service. Examples of cloud-based platforms as a service may include, but are not limited to, one or more of Micorsoft Azure, Cloud Foundry, Amazon.com Web Services, Force.com, Engine Yard, Progress Rollbase, OpenEdge, etc. It should be recognized that the preceding examples are illustrative and not exhaustive and that other PaaSs exist and may be used without departing from the disclosure herein.

The analytics server 126 may include one or more computing devices having data processing, storing, and communication capabilities. For example, the analytics server 126 may include one or more hardware servers, server arrays, storage devices, systems, etc., and/or may be centralized or distributed/cloud-based. In some implementations, the analytics server 126 may include one or more virtual servers, which operate in a host server environment and access the physical hardware of the host server including, for example, a processor, memory, storage, network interfaces, etc., via an abstraction layer (e.g., a virtual machine manager).

In one embodiment, the analytics server 126 provides analytics. Examples of analytics include, but are not limited to, one or more of Google Analytics, GoSquared, Oracle Business Analytics, IBM Business Analytics Live, etc. It should be recognized that the preceding examples are illustrative and not exhaustive and that other analytics exist and may be used without departing from the disclosure herein.

The on-premise server 128 may include one or more computing devices having data processing, storing, and communication capabilities. For example, the on-premise server 128 may include one or more hardware servers, server arrays, storage devices, systems, etc., and/or may be centralized or distributed. In some implementations, the on-premise server 128 may include one or more virtual servers, which operate in a host server environment and access the physical hardware of the host server including, for example, a processor, memory, storage, network interfaces, etc., via an abstraction layer (e.g., a virtual machine manager). In one embodiment, the on-premise server 128 is a device located behind a network address translator (NAT) (not shown) and/or a firewall (not shown). For example, in one embodiment, on-premise server 128 is device located on-site in a company's network.

In one embodiment, the on-premise server 128 may include one or more on-premise applications (not shown). An on-premise application may be any application including, but not limited to, one or more of an application written in Java, C, C++, Microsoft.net, etc. For example, the on-premise server 128 may include an on-premise document management application that accesses and manipulates documents (i.e. data) stored in a cloud data source 150, on-premise data source 152 or both.

Similar to the on-premise server 128, the on-premise data source 152 may be located behind a firewall (not shown) and/or NAT (not shown). For example, the on-premise data source 152 may be a database on a company's intranet. In some embodiments, the connectivity service 220 beneficially provides connectivity as a service to one or more data sources, which may include an on-premise data source 152 even when the on-premise data source 152 is located behind a firewall (not shown), NAT (not shown) or otherwise publicly inaccessible via the Internet. U.S. Provisional Patent Application No. 61/891,290, filed Oct. 15, 2013 and entitled "On-Premise Data Access and Firewall Tunneling" is herein incorporated by reference in its entirety. For example, in one embodiment, the on-premise data source 152 is similar to a "host device 124," as described in 61/891,290, the "direct access storage 132," as described in 61/891,290, stores a big data 102$x$/relational 106$x$/NoSQL 108$x$ database, and the connectivity service 220 may utilize the "notification server 122" and "on-premise server 116," as described in 61/891,290, to access data stored by the on-premise data source 152.

Figure 2:
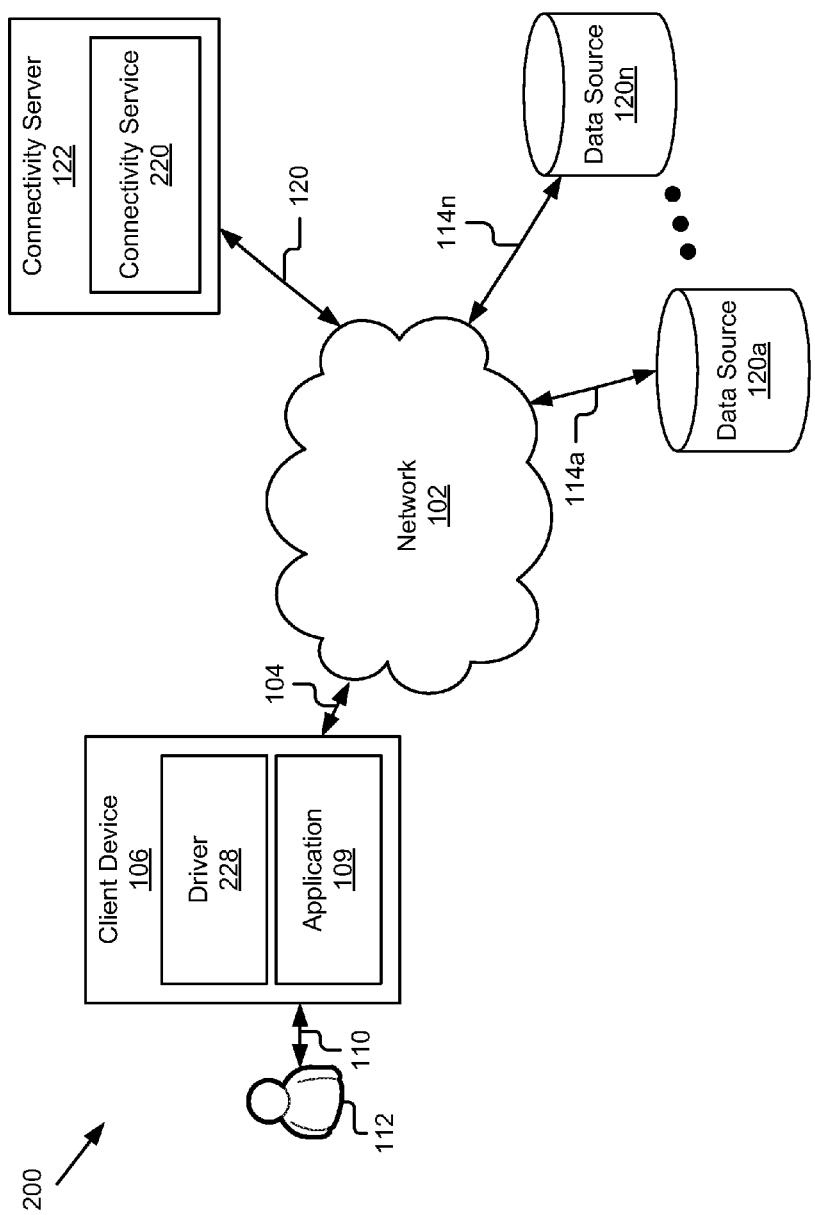
FIG. 2 is a block diagram illustrating an example system for connectivity as a service according to one embodiment.

FIG. 2 is a block diagram illustrating an example system 200 for connectivity as a service according to one embodiment. The illustrated system 200 includes a client device 106, a connectivity server 122 and one or more data sources 120$a$ ... 120$n$, which are communicatively coupled via a network 102 for interaction with one another. For example, the client devices 106 may be coupled to the network 102 via signal line 104. The data sources 120$a$ ... 120$n$ (also referred to individually as data source 120 and collectively as data sources 120) may be respectively coupled to the network 102 via signal lines 114$a$ ... 114$n$. The connectivity server 122 may be coupled to the network 102 via signal line 120. The use of the nomenclature "a" and "n" in the reference numbers indicates that any number of those elements having that nomenclature may be included. In some embodiments, the client device 106 may be accessed by a user 112 as illustrated by line 110.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 200. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation, Comma Separated Values (CSV), etc. In addition, all or some of links can be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

In one embodiment, the connectivity illustrated by signal lines 140, 142, 144, 146 and 148 of FIG. 1 uses the network 102 of FIG. 2. For example, in one embodiment, the network 102 is the Internet and connectivity to one or more of a cloud data source 150 (as represented by signal line 140), an on-premise data source 152 (as represented by signal line 148), an analytics server 126 (as represented by signal line 142), a PaaS server 124 (as represented by signal line 146) and an on-premise server 128 (as represented by signal line 144) uses the Internet.

The client device 106 is a computing device having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, input devices (e.g. mouse, keyboard, camera, sensors, etc.) firmware, operating systems, drivers, various physical connection interfaces (e.g., USB, HDMI, etc.). The client devices 106 may couple to and communicate with one another and the other entities (e.g. connectivity server 122) of the system 200 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1 for clarity and convenience, the system 200 may include any number of client devices 106, and the connectivity service 220 may provide connectivity to any number of data sources 120 to any number of applications 109 on any number of client devices 106. In addition, the any number of client devices 106 may be the same or different types of computing devices 106. In the depicted implementation, the client device 106 contains an instance a driver 228 and an application 109.

The application 109 may be storable in a memory and executable by a processor of a client device 106. In one embodiment, the application 109 requests and uses data which is stored by one or more data sources 120. The application 109 may be any application written in any language. For example, the application 109 may be one of a Java, a C, a C++ and Microsoft.net application. It should be recognized that the preceding are merely examples of applications 109 and others exist.

The driver 228 may be storable in a memory and executable by a processor of a client device 106. The driver 228 may refer to a traditional driver, e.g. a JDBC driver or ODBC driver, or a client library, e.g. an HTTP client library to communicate using REST protocols. In one embodiment, the driver 228 is a standards based driver. For example, in some embodiments, the driver 228 uses one or more of the open database connectivity (ODBC), Java database connectivity (JDBC) and REST protocols. In one embodiment, the driver 228 communicates with the connectivity service 220 to expose and provide the application 109 access to data stored by one or more data sources 120. In other words, according to one embodiment, the client device 106 may include a single driver 228 that allows the client device 106 to access (in conjunction with the connectivity service 220) any number of data sources 120 including any number of different types of data sources 120 and any number of classes of data sources 120.

The connectivity server 122 may include one or more computing devices having data processing, storing, and communication capabilities. For example, the connectivity server 122 may include one or more hardware servers, server arrays, storage devices, systems, etc., and/or may be centralized or distributed/cloud-based. In some implementations, the connectivity server 122 may include one or more virtual servers, which operate in a host server environment and access the physical hardware of the host server including, for example, a processor, memory, storage, network interfaces, etc., via an abstraction layer (e.g., a virtual machine manager). In one embodiment, discussed below with reference to FIG. 3, the connectivity server 122 may include a load balancer 130 and one or more data access servers 132.

In one embodiment, the connectivity server 122 includes the connectivity service 220 module. The connectivity service 220 module may be storable in a memory and executable by a processor of a connectivity server 122 to provide an application 109 using a driver 228 access to data stored by any number of data sources 120 via the network 102.

A data source 120 may include one or more non-transitory computer-readable mediums for storing data. While the illustrated data sources 120 are illustrated as connected to the network 102 via signal lines 114, in some embodiments, a data source 120 may be included in a memory or storage device (e.g. a hard disk drive) of a server (not shown) or connected to (e.g. as a direct access storage) to a server (not shown) and the server (not pictured) is connected to the network 102 via a signal line (not shown). In one embodiment, the data source 120 includes a database management system (DBMS). For example, the DBMS may be a relational (e.g. SQL) or non-relational (e.g. NoSQL) DBMS. In some instances, the DBMS may store data in multi-dimensional tables comprised of rows and columns, and manipulate, i.e., insert, select, update and/or delete, rows of data using programmatic operations referred to herein as "queries." While two data sources 120 are illustrated, it will be recognized that any number of data sources 120 may be included. For example, in one embodiment, the non-relational database 120 is a distributed database.

It should be recognized that the client device 106 and data source 120 may vary based on context. For example, in one embodiment, the data source(s) 120 may refer to one or more cloud data sources 150 and the client device 106 may refer to an on-premise server 128, when the application 109 is an on-premise application obtaining data from the one or more cloud data sources 150, and the client device 106 may refer to an analytics server 126 and the data source 120 may refer to one or more on-premise data sources 152, when the application 109 is a live analytics application obtaining data from the on-premise data source 152.

It should be understood that the system 200 illustrated in FIG. 2 is representative of an example system for connectivity as a service according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems may be included.

For example, in one embodiment, the connectivity server 122 may include the "on-premise server 116" and "notification server 122" as described in U.S. Provisional Patent Application No. 61/891,290, which is incorporated by reference in its entirety, to provide access to an on-premise data source 152 that is not publicly accessible over the network 102 (similar to accessing a "host device 124" behind a firewall and/or NAT as disclosed in U.S. Provisional Patent Application No. 61/891,290). It should be noted that while the "on-premise server 116" of U.S. Provisional Patent Application No. 61/891,290 and the on-premise server 128 of the present application have a similar name, these servers are distinct computing devices and have different roles and functionality.

Figure 3:
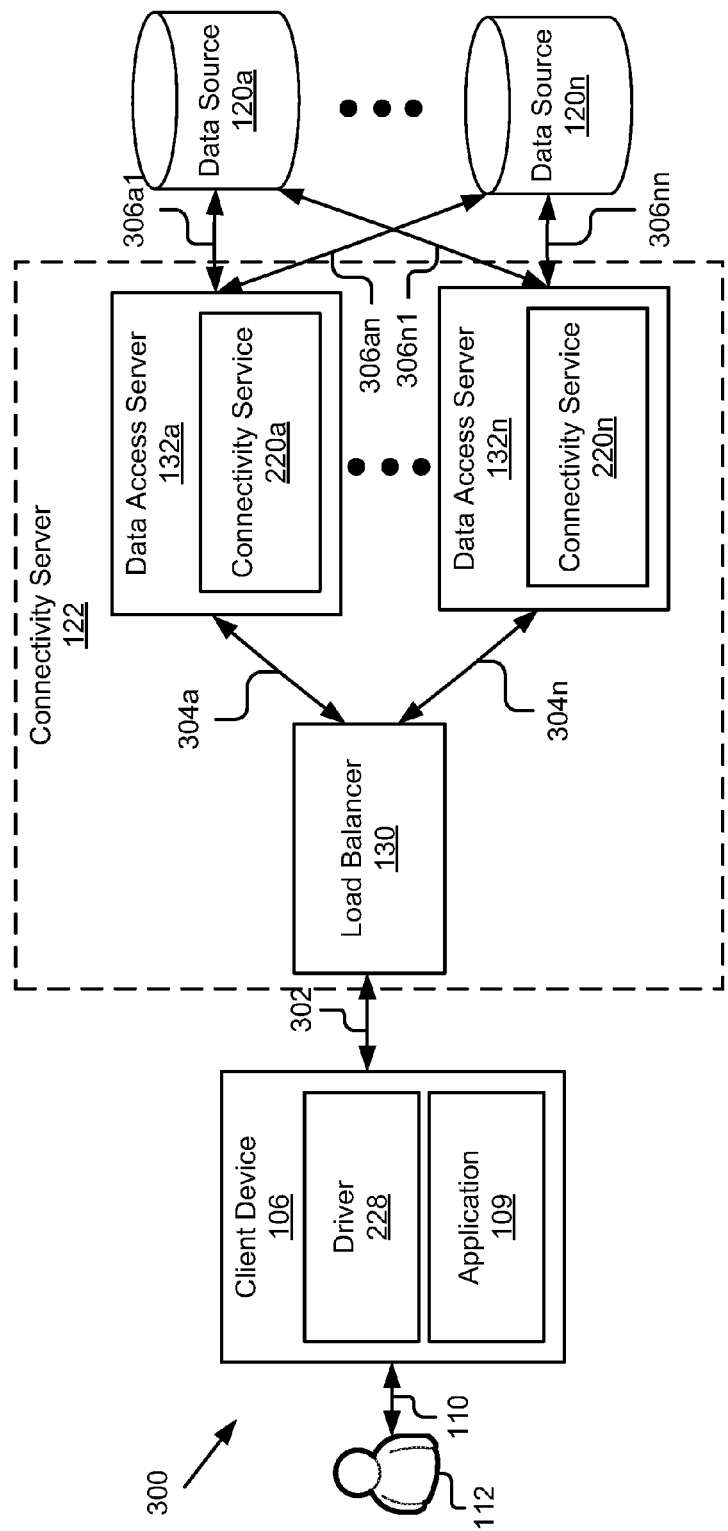
FIG. 3 is block diagram illustrating an example system for connectivity as a service including a load balancer according to one embodiment.

In another example, FIG. 3 is block diagram illustrating an example system for connectivity as a service including a load balancer according to one embodiment. As mentioned above with reference to FIG. 2, the connectivity server may include one or more computing devices. In one embodiment, the connectivity server 122 may include a plurality of data access servers (DAS) 132a . . . 132n (referred to collectively as data access servers 132 and individually as data access server 132) which may be coupled to at least one load balancer 130 via signal lines 304a . . . 304n. In one embodiment, each data access server 132 may be coupled to the one or more data sources 120. For example, data access server 132a may be coupled to one or more of data source 120a . . . 120n via signal lines 306a1 . . . 306an, respectively, and data server 132n may be coupled to one or more of data sources 120a . . . 120n via signal lines 306n1 . . . 306nn, respectively. In one embodiment, the load balancer 130 may be coupled to a client device 106 via signal line 302. In one embodiment, the coupling represented by at least one of the signal lines 302, 304a . . . 304n, 306a1 . . . 306an, 306n1 . . . 306nn may use the network 102 of FIG. 2.

While FIG. 3 illustrates only one client device 106, it should be recognized that in some embodiments, the connectivity service 220 is a cloud-based service that may provide simultaneous connectivity for any number of users 112 using any number of applications 109 on any number of client devices 106 to any number of data sources 120. Additionally, it should be recognized that while FIG. 3 shows only one load balancer 130, additional load balancers 130 may be included to distribute the load from multiple client devices 106 to the multiple data access servers 132 and to provide redundancy in the event of failure. The role of the load balancer 130 may be better understood by using an example. For example, assume the application 109 of client device 106 is communicatively coupled to data access server 132a which is providing application 109 connectivity to data source 120a and assume that data access server 132n is idle (i.e. not providing connectivity). Now assume a second application (not shown) whether on the client device 106 or another client device (not shown) requests connectivity to data sources 120a and 120n; in one embodiment, the load balancer 130 receives a request for connectivity from the second application (not shown) determines which data access server 132 ought to handle the request for connectivity (e.g. determines what data access servers 132 are available and/or non-idle, whether a non-idle data access server 132 has enough resources to handle the connectivity request, which data access server 132 has the most available resources, etc.) and determines that data access server 132n ought to handle the connectivity request and data access server 132n provides connectivity between the second application (not shown) and the requested data sources 120a and 120n. Such load balancing may beneficially reduce the amount of time for connecting an application 109 and data source(s) 120 and for providing data between the application 109 and data source(s) 120.

In some embodiments, the load balancer 130 may have a timeout period and when data is not passed between the client device 106 and the load balancer 130 within that time period the connection is severed. For example, assume the load balancer 130 has a timeout period of one minute and that data access server 132a is providing connectivity to data source 120a. In one embodiment, the load balancer 130 receives a query of an application 109 from the client device 106, passes the query to the data access server 132a and starts a timer. In one embodiment, when the timer meets or exceeds a threshold before the load balancer 132a returns query results, the load balancer 130 may sever the connection and end the connectivity session.

However, the timeout behavior may be undesirable in some circumstances. For example, the query may be across multiple data sources 120, a queried data source 120 may be massive, the query may be complex (e.g. a complex join across multiple tables) and the query may return a great number of results that need to be processed (e.g. aggregated, sorted, etc.) before the results may be returned, which individually or in combination may require a greater period of time to return results of the query to the client device 106 than is allotted by the load balancer's 130 timeout period. In one embodiment, the timeout period of the load balancer 130 may be increased to permit longer querying; however, such a solution may not always be an option and may have other consequences. For example, assume load balancer 130 and data access servers 132 are provided by a third party service (e.g. Amazon's Web Service (AWS)); in one embodiment, it may not be permissible to alter the timeout period of the load balancers provided by AWS. In some embodiments, the connectivity service 220 includes features and functionality, discussed below with reference to FIGS. 6 and 9 that beneficially reduce or eliminate the potential for a load balancer 130 to timeout during a query.

Figure 4:
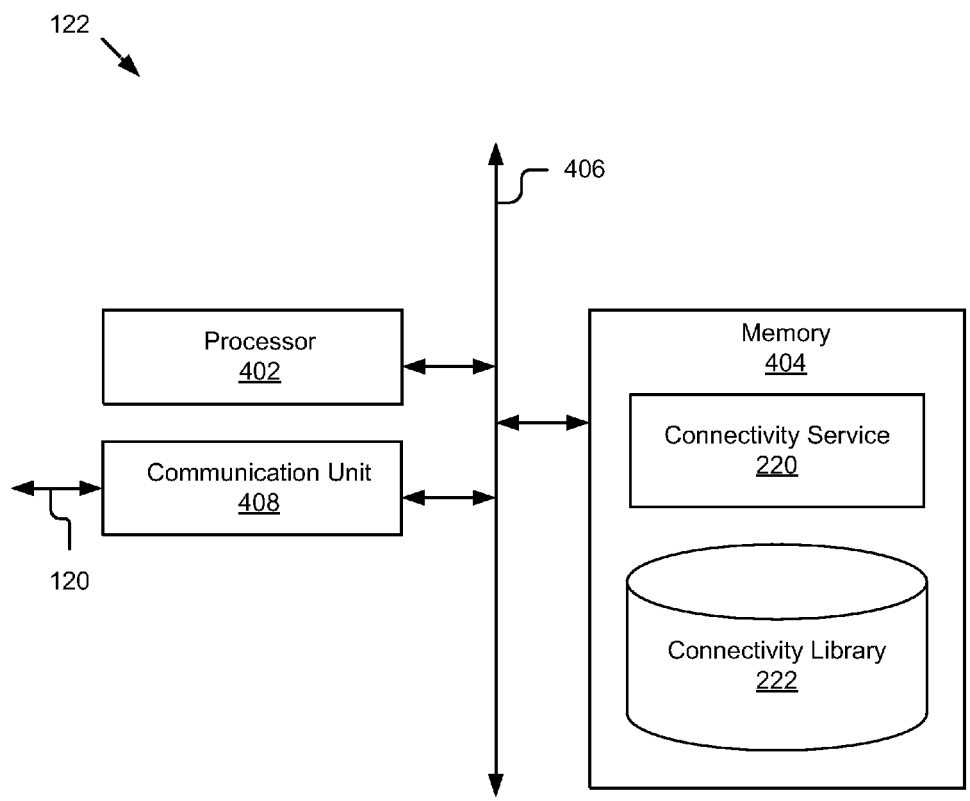
FIG. 4 is a block diagram illustrating an example connectivity server according to one embodiment.

FIG. 4 is a block diagram of an example connectivity server 122 according to one embodiment. The connectivity server 122, as illustrated, may include a processor 402, a memory 404 and a communication unit 408, which may be communicatively coupled by a communications bus 406. The connectivity server 122 depicted in FIG. 4 is provided by way of example and it should be understood that it may take other forms and include additional or fewer components without departing from the scope of the present disclosure. For example, while not shown, the connectivity server 122 may include a storage device, input and output devices (e.g., a display, a keyboard, a mouse, touch screen, speakers, etc.), various operating systems, sensors, additional processors, and other physical configurations.

The processor 402 may execute code, routines and software instructions by performing various input/output, logical, and/or mathematical operations. The processor 402 have various computing architectures to process data signals including, for example, a complex instruction set computer (CISC) architecture, a reduced instruction set computer (RISC) architecture, and/or an architecture implementing a combination of instruction sets. The processor 402 may be physical and/or virtual, and may include a single core or plurality of processing units and/or cores. In some implementations, the processor 402 may be capable of generating and providing electronic display signals to a display device (not shown), supporting the display of images, capturing and transmitting images, performing complex tasks including various types of feature extraction and sampling, etc. In some implementations, the processor 402 may be coupled to the memory 404 via the bus 406 to access data and instructions therefrom and store data therein. The bus 406 may couple the processor 402 to the other components of the connectivity server 122 including, for example, the memory 404 and communication unit 408.

The memory 404 may store and provide access to data to the other components of the connectivity server 122. In some implementations, the memory 404 may store instructions and/or data that may be executed by the processor 402. For example, in the illustrated embodiment, the memory 404 may store the connectivity service 220 and connectivity library 222. The memory 404 is also capable of storing other instructions and data, including, for example, an operating system, hardware drivers, other software applications, databases, etc. The memory 404 may be coupled to the bus 406 for communication with the processor 402 and the other components of the connectivity server 122. In the illustrated embodiment, the memory 404 stores a connectivity service 220 module and a connectivity library 222.

The memory 404 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 402. In some embodiments, the memory 404 may include one or more of volatile memory and non-volatile memory. For example, the memory 404 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blu-Ray™, etc.). It should be understood that the memory 404 may be a single device or may include multiple types of devices and configurations.

The bus 406 can include a communication bus for transferring data between components of a connectivity server 122 and/or between computing devices (e.g. between the connectivity server 122 and one or more of the client device 106 and at least one data source 120), a network bus system including the network 102 or portions thereof, a processor mesh, a combination thereof, etc. In some implementations, the connectivity service 220, its sub-components and various other software operating on the connectivity server 122 (e.g., an operating system, etc.) may cooperate and communicate via a software communication mechanism implemented in association with the bus 406. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 408 may include one or more interface devices (I/F) for wired and/or wireless connectivity with the network 102. For instance, the communication unit 408 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 408 can link the processor 402 to the network 102, which may in turn be coupled to other processing systems.

The communication unit 408 can provide other connections to the network 102 and to other entities of the system 100/200 using various standard network communication protocols.

As mentioned above, the connectivity server 122 may include other and/or fewer components. Examples of other components may include a display, an input device, a sensor, etc. (not shown). In one embodiment, the connectivity server 122 includes a display. The display may display electronic images and data for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the connectivity server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Example Connectivity Service 220 Module

Figure 5:
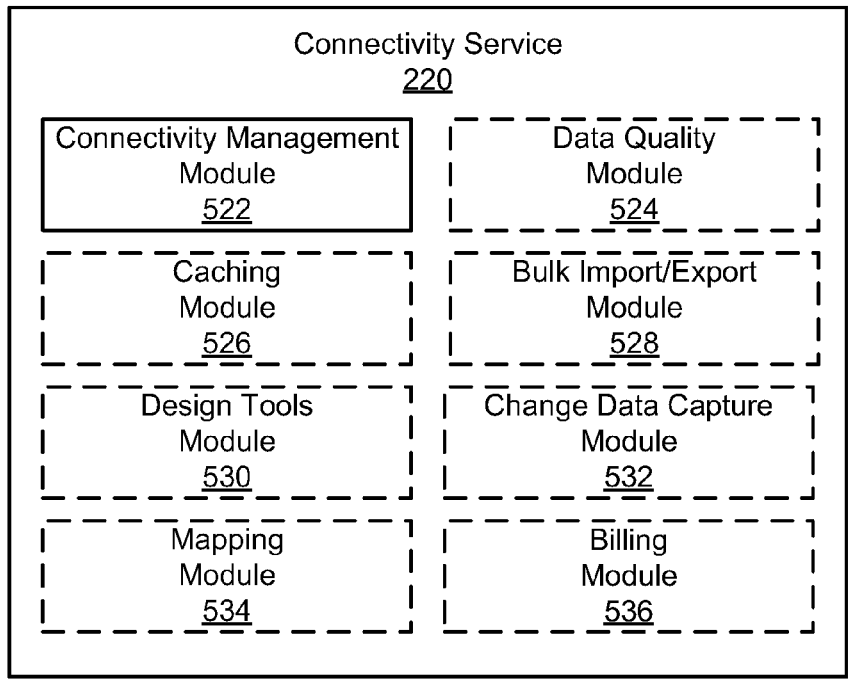
FIG. 5 is a block diagram of a connectivity service module according to one embodiment.

Referring now to FIG. 5, the connectivity service 220 module is shown in more detail according to one embodiment. FIG. 5 is a block diagram of the connectivity service 220 module included in a connectivity server 122 (or data access server 322 thereof) according to one embodiment.

The connectivity service 220 module provides connectivity as a service. In one embodiment, the connectivity as a service is a cloud-based service which beneficially makes the connectivity available to a variety of different devices in a variety of different locations (e.g. servers, personal computers, mobile devices, or any other device with access the network 102 (e.g. the Internet) may obtain connectivity to one or more data sources 120 using a single driver 228 that may plug into any third-party application suite). In one embodiment, the connectivity service 220 module comprises a connectivity management module 522. The connectivity management module 522 provides connectivity of data sources as a service.

In one embodiment, the connectivity service 220 module provides one or more services in addition to and/or related to connectivity as a service. In one embodiment, the connectivity service 220 may provide backend as a service to mobile client devices 106. For example, in some embodiments, the connectivity service 220 may provide data management and connectivity for mobile applications 109 (e.g. a mobile application developed using the JavaScript HTML 5 software development kit).

In some embodiments, connectivity service 220 allows connections to be securely shared across a team. For example, secure and authorized connections may be reused by multiple users 112 or applications 109. In some embodiments, the connectivity service 220 provides security and compliance with various security standards. For example, in some embodiments, the connectivity provided by the connectivity service 220 complies with SOC-2 and SOC-3 certification requirements.

In some embodiments, the connectivity service 220 may provide a bulk protocol and transactionality. In some embodiments, the connectivity service 220 provides for easy to use web based query development. For example, in some embodiments, the connectivity service 220 may provide one or more of creation and storage of queries to reuse as virtual views, support for executing native report (i.e. reports native to a data source 120) as stored procedures and a database schema viewer.

In some embodiments, the connectivity service 220 may include additional modules for providing the services in addition to or related to the connectivity as a service. For example, in some embodiments, the connectivity service 220 module may include one or more additional modules including, for example, an optional data quality module 524, an optional caching module 526, an optional bulk import/export module 528, an optional design tools module 530, an optional change data capture module 532, an optional mapping module 534 and an optional billing module 536. It will be recognized that the modules 522, 524, 526, 528, 530, 532, 534, 536, comprised in the connectivity service 220 module may not necessarily all reside on the same connectivity server 122. In one embodiment, the modules 522, 524, 526, 528, 530, 532, 534, 536 and/or their functionality are distributed across multiple connectivity servers 122 (or data access servers 132).

The connectivity management module 522 includes code and routines for providing connectivity to one or more data sources 120. In one embodiment, the connectivity management module 522 is a set of instructions executable by the processor 402. In another embodiment, the connectivity management module 522 is stored in the memory 404 and is accessible and executable by the processor 402. In either embodiment, the connectivity management module 522 is adapted for cooperation and communication with the processor 402, other components of the connectivity server 122 and other components of the connectivity service 220 module.

Figure 6:
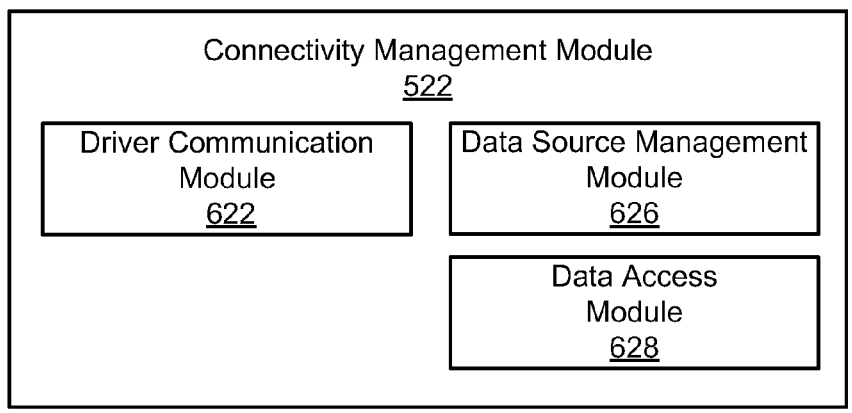
FIG. 6 is a block diagram of a connectivity management module according to one embodiment.

Referring now to FIG. 6, in one embodiment, the connectivity management module 522 comprises a driver communication module 622, a data source management module 626 and a data access module 628. It should be recognized that the modules 622, 626, 628, comprised in the connectivity management module 522 may not necessarily all be on the same device. In one embodiment, the modules 622, 626, 628 and/or their functionality are distributed across multiple connectivity servers 122 (or data access servers 132).

The driver communication module 622 includes code and routines for communication between the connectivity service 220 module and the driver 228. In one embodiment, the driver communication module 622 is a set of instructions executable by the processor 402. In another embodiment, the driver communication module 622 is stored in the memory 404 and is accessible and executable by the processor 402. In either embodiment, the driver communication module 622 is adapted for cooperation and communication with the processor 402, other components of the connectivity server 122, other components of the connectivity service 220 module and other components of the connectivity management module 522.

In one embodiment, the driver communication module 622 communicates with the driver 228 of the client device 106 to receive a request (e.g. a query) from and provide a response (e.g. results or other response from data source(s) 120) to the application 109 using the driver 228.

In one embodiment, the driver 228 receives a query to manipulate data (e.g. a query to create a table, drop a table, delete data, select data, insert data, etc.) from the application 109. The driver 228 initiates a connection to the connectivity service 220 and communicates with the connectivity service 220 using the connection once established. In one embodiment, the driver 228 initiates a stateless connection between the driver 228 of the computing device 106 and the connectivity service 220. For example, in one embodiment, the driver 228 may use the REST API to initiate and establish a HTTP or HTTPS connection. In some embodiments, the connection between the driver 228 and connectivity service 220 is a secure connection (e.g. HTTPS) to protect the data being transferred.

In one embodiment, the driver 228 and the connectivity service 220 communicate using a wire protocol. For example, in one embodiment, assume the driver 228 is a JDBC driver and the application 109 passes a SQL query to the driver 228; in one embodiment, the driver 228 receives the SQL query from the application 109 and uses a driver-side communication module (not shown) included in the driver 228 to translate or encode the SQL query using the wire protocol and sends the translated query to the connectivity service 220. The driver communication module 622 receives the translated query. In one embodiment, the driver communication module 622 processes the translated query for use by one or more of the data source management module 626 and the data access module 628. For example, the driver communication module 622 translates or decodes the packets of the translated query and any tokens therein into query form to be forwarded to the data access module 628.

In another example, in one embodiment, the driver communication module 622, responsive to the connectivity service 220 (e.g. the data access module 628) receiving a response (e.g. results) from the one or more data sources 120, translates the response using the wire protocol and passes the translated response to the driver 228. In one embodiment, the driver-side communication module (not shown) processes the translated response for use by the application 109. For example, when results are received at the connectivity service 220, the driver communication module 622 translates or encodes the response using the wire protocol and the driver-side communication module (not shown) of the driver 228 translates or decodes the response into a form usable by the application 109 (e.g. data results of a SQL query or a status of a SQL query depending on the type of SQL query sent to the connectivity service 220).

Depending on the embodiment, the wire protocol may beneficially provide one or more of a state over a stateless connection, efficient data compression, load balancer 130 timeout prevention, data management features (e.g. data pagination), etc. It should be recognized that the preceding are merely examples of potential benefits provided by the wire protocol and that others exist. For clarity and convenience, the preceding examples are discussed further below.

In one embodiment, the wire protocol includes one or more tokens. In one embodiment, the wire protocol includes a session token. In one embodiment, a session token (e.g. a session id) is included in all communications between the driver 228 and the connectivity service 220. In one embodiment, the use of a session token resolves any issues with the application 109 and/or driver 228 not having a persistent socket for connection (e.g. when the computing device 106 is connecting over a LAN which may use a NAT). Since the connectivity service 220 may simultaneously provide connectivity for multiple applications 109, in one embodiment, the session token may be used to match queries with the appropriate data sources 120 and responses (e.g. data resulting from query) with the appropriate application 109/driver 228.

In one embodiment, a token may provide state information. Examples of state information may include information about the state of a query, a state of a response, a state of the session, a state of a connection (e.g. between the driver 228 and the connectivity service 220 or between the connectivity service 220 and the one or more data sources 120), etc. For example, in one embodiment, one or more tokens may be sent to indicate the status of the query to the driver 228. For example, in one embodiment, the driver communication module 622 periodically sends a message over the connection to the driver 228 that includes a token indicating to the driver 228 that the one or more data sources 120 are being queried, but no results have been returned (i.e. a query in progress state).

As mentioned above, in one embodiment, the driver communication module 622 may send a message to the driver 228 periodically after a query has been received from the driver 228 but before results are sent to the driver 228. In one embodiment, such a message is occasionally referred to herein as a "continuation message" and prevents a load balancer 130 (through which the connection between the driver 228 and connectivity service 220 may pass as illustrated in FIG. 3) from timing out and severing the connection.

In some embodiments, timeout of the load balancer 130 and severing of the connection between the connectivity service 220 and the driver 228 is avoided because the connectivity service 220 transmits a response to a request on the same connection on which the connectivity service 220 received the request. In some embodiments, a subsequent request does not necessarily use the same connection as a previous request; however, the response to the subsequent request is transmitted using the same connection on which the subsequent request was received. For example, assuming the connectivity service 220 received Request A on Connection A, the connectivity service 220 transmits a response to Request A (i.e. Response A) on Connection A to avoid severing of Connection A, and a subsequent request (i.e. Request B) may be received on a different connection (i.e. Connection B) and the response to Request B (i.e. Response B—the subsequent response) is transmitted on Connection B (i.e. the same connection on which Request B was received) to prevent severing of Connection B.

In one embodiment, the driver communication module 622 sets a timer upon receiving a message from the driver 228 (e.g. a message including a query) and upon the timer exceeding a threshold, the driver communication module 622 sends a continuation message to the driver 228. In one embodiment, the threshold which determines the period for driver communication module 622 sending such continuation messages is less than the timeout period of the load balancer 130. For example, the load balancer 130 may have a timeout period of 60 seconds and the driver communication module 622 sets a timer for 59 seconds or 30 seconds. In one embodiment, the driver communication module 622 resets the timer responsive to sending a continuation message (e.g. a message including one or more of a query in progress token, a more results expected token, partial results of the query, complete results of the query, etc.) to the driver 228 and/or receiving a message (e.g. another query from the driver 228 or a periodic keep alive message from the driver 228) which restarts the timeout period of the load balancer 130.

In one embodiment, the driver 228 may ignore one or more tokens. For example, in one embodiment, the driver 228 upon receiving the query in progress token performs no action. In another embodiment, the driver 228 may pass information based on one or more tokens to the application 109. For example, in one embodiment, the driver 228, upon receiving the query in progress token, may notify the application 109 of the query's status.

In one embodiment, one or more tokens may provide for data pagination. In one embodiment, the driver communication module 622 does not automatically send the entirety of received data to the driver 228 for the application 109. In one embodiment, a data set is paginated when the driver communication module 622 determines a data set exceeds a threshold. For example, assume that the connectivity service 220 receives a large number of results (i.e. data) from the one or more data sources 120. In one embodiment, the connectivity service 220 determines that the results exceed a threshold and paginates the results.

In one embodiment, the connection service 220 buffers the data received (e.g. results from the one or more data sources 120) in memory 404. For example, in one embodiment, the connectivity service 220 buffers the data received in a relational database stored on a hard disk drive included in the memory 404. In one embodiment, responsive to the driver communication module 622 determining that a data set exceeds a data set threshold, the driver communication module 622 paginates the data set. The data set threshold may be based on one or more metrics e.g. a number of rows, a number of bytes, etc. For example, in one embodiment, the driver communication module 622 determines that a data set threshold is exceeded when more than 50 rows of results are received and paginates the results by sending the first 50 rows of results to the driver 228 and maintaining the remaining rows in the buffer. In one embodiment, the message that includes the first 50 rows includes a token indicating that additional results exist. In one embodiment, the remaining rows remain buffered at the connectivity server 122 (or DAS 132 thereof) until one or more of a buffer timeout occurs (at which point, depending on the embodiment, the data sources may be automatically re-queried or an error indicating that the results are no longer available and the user 112 should re-run the query if/when a next page of results is requested), a request for the next page of results is received from the driver 228 prior to a buffer timeout (e.g. when a user 112 uses a graphical user interface (GUI) to scroll or page to a $51^{st}$ or greater result, the driver 228 sends a message that includes a token requesting the next page (i.e. the next 50 results)), or a no further results needed message is received from the driver 228 (e.g. a message including a token indicating the remaining results are not needed and may be expunged from the buffer which may be received responsive to a user 112 navigating away from a results page in the application 109).

In one embodiment, the data set threshold may be a default threshold associated with the driver communication module 622. For example, in one embodiment, the driver communication module 622 is preconfigured with a default data set threshold. In one embodiment, the data set threshold may be application 109 dependent. For example, assume the application only displays the first 30 rows of results; in one embodiment, the driver 228 may pass the driver communication module 622 a data set threshold of 30 rows, which the driver communication module 622 uses to determine whether results need to be paginated and, if so, paginates accordingly (e.g. sends results in 30 row increments upon request).

Pagination of data sets may beneficially reduce the amount of bandwidth consumed. Such benefits may be particularly beneficial when results are large and the computing device 106 is connected to a LAN with limited bandwidth.

In one embodiment, the wire protocol includes a binary protocol. In one embodiment, the binary protocol is used to compress data efficiently. For example, the driver communication module 622 may use the binary protocol to compress results of a query before sending the results to the driver 228. Similarly, the driver 228 may use the binary protocol to compress a query (e.g. an insert query and the data to be inserted) before sending the query to the driver communication module 622 of the connectivity service 220.

In one embodiment, the driver-side communication module (not shown) of the driver 228 and driver communication module 622 are both capable of processing messages sent using the wire protocol. For example, in one embodiment, the driver communication module 622 processes wire protocol messages for use by one or more of the data source management module 626 and data access module 628. In another example, in one embodiment, the driver 228 processes wire protocol messages for use by the application 109.

In one embodiment, processing a wire protocol message may include one or more of extracting an operation, extracting a parameter, extracting a token and translating a binary string. For example, in one embodiment, assume the driver-side communication module (not shown) of the driver 228 generates a URL, constructs the body of a message by generating tokens and translating into binary data according to the wire protocol and sends this wire protocol message to the driver communication module 622 over an HTTP or HTTPS connection; in one embodiment, the driver communication module 622 parses the URL of the message header to extract any operations and parameters, parses the body of the message to extract any tokens and binary data, and translates the binary data, if any.

In one embodiment, the driver communication module 622 passes the processed message to one or more of the data source management module 626 and data access module 628. In one embodiment, the driver communication module 622 stores the processed message in memory 404 (or any other non-transitory storage medium communicatively accessible). The other modules of the connectivity service 220 module including, e.g., data source management module 626 and data access module 628, may retrieve the processed query by accessing the memory 404 (or other non-transitory storage medium).

The data source management module 626 includes code and routines for determining the one or more data sources for which connectivity is requested. In one embodiment, the data source management module 626 is a set of instructions executable by the processor 402. In another embodiment, the data source management module 626 is stored in the memory 404 and is accessible and executable by the processor 402. In either embodiment, the data source management module 626 is adapted for cooperation and communication with the processor 402, other components of the connectivity server 122, other components of the connectivity service 220 module and other components of the connectivity management module 522.

The data source management module 626 determines the one or more data sources 120 to which connectivity is to be provided. In one embodiment, the data source management module 626 determines the one or more data sources 120 based on information received from the application 109 and/or driver 228. For example, in one embodiment, the data source management module 626 receives one or more tokens from the driver communication module 622 identifying one or more requested data sources 120, and the data source management module 626 determines the application 109 seeks to connect to the one or more data sources 120 identified by the one or more tokens.

In one embodiment, the data source management module 626 provides authentication of one or more of a user 112 and the client device 106. In one embodiment, the data source management module 626 provides single sign-on for connectivity to one or more data sources 120. For example, in one embodiment, a user 112 sets up an account with the connectivity service 220 and the data source management module 626 provides connectivity login credentials used to log into the connectivity server 122. In one embodiment, the user 112 logs into the connectivity server 122 when the data source management module 626 successfully authenticates the connectivity login credentials. For example, in one embodiment, the data source management module 626 receives the connectivity login credentials with an initial connection request from the driver 228.

In one embodiment, the data source management module 626 manages authentication during an established session. For example, assume the data source management module 626 successfully authenticates the connectivity login credentials received with an initial request form the driver 228; in one embodiment, the data source management issues an authentication and/or session token, which is sent (e.g. via the driver communication module 622) to the driver 228. In one embodiment, when a driver 228 sends a request such as a query the data source management module 626 receives the authentication and/or session token (e.g. from the driver communication module 622) and authenticates the request. In some embodiments, if the authentication of the authentication and/or session token fails, the data source management module 626 denies the request and an error may be sent to the driver via the driver communication module 622.

In one embodiment, the user 112 provides the data source management module 626 source login credentials for the one or more data sources 120 the user intends to have the application 109 access. For example, assume the application 109 should access a cloud data source 150 (e.g. SalesForce) and a PAS server 124 (e.g. Rollbase), in one embodiment, the user 112 provides the source login credentials for the cloud data source 150 (e.g. SalesForce user name and password) and the source login credentials to the PAS server 124 (e.g. Rollbase username and password) and the data source management module 626 associates the source login credentials with and stores the source login credentials for the user 112 that is logged in. In one embodiment, the data source management module 626 encrypts the source login credentials and stores the encrypted source login credentials for the user 112 that is logged in.

Subsequently, upon receiving connectivity login credentials (e.g. one or more tokens including the login credentials obtained from the driver communication module 622) via the driver 228, the data source management module 626 authenticates the connectivity login credentials and subsequent to successful authentication of the connectivity login credentials provides the source login credentials for the one or more data sources 120.

In one embodiment, after the data source management module 626 successfully authenticates the connectivity login credentials, the data source management module 626 receives one or more tokens identifying one or more data sources, determines the application 109 seeks to connect to the one or more data sources 120 identified by the one or more tokens, determines whether source login credentials are available for the one or more sources, and, responsive to the source credentials being available, sends the source credentials to the one or more data sources 120. In one embodiment, when the source login credentials are unavailable, the data source management module 626 sends for presentation to the user 112 one or more of an error message and a prompt to input source login credentials.

In some embodiments, the data source management module 626 may not perform single sign-on or may require additional user inputs for authentication at the connectivity server 122 and/or authentication at the one or more data sources 120.

In one embodiment, the data source management module 626 passes the source login credentials to the one or more data sources 120 for authentication (e.g. responsive to authentication of the connectivity login credentials by the data source management module 626). In one embodiment, the data source management module 626 stores the source login credentials in memory 404 (or any other non-transitory storage medium communicatively accessible) and the data source management module 626 may retrieve the source login credentials by accessing the memory 404 (or other non-transitory storage medium). In one embodiment, source login credentials are stored in an encrypted form in the memory 404 (or other non-transitory storage medium) and decoded prior to passing the source credentials to the associated data source 120.

The data access module 628 includes code and routines for connecting to and accessing data stored on the one or more data sources 120. In one embodiment, the data access module 628 is a set of instructions executable by the processor 402. In another embodiment, the data access module 628 is stored in the memory 404 and is accessible and executable by the processor 402. In either embodiment, the data access module 628 is adapted for cooperation and communication with the processor 402, other components of the connectivity server 122, other components of the connectivity service 220 module and other components of the connectivity management module 522.

The data access module 628 provides communication between the connectivity service 220 and the one or more data sources 120. In one embodiment, the communication between the connectivity service 220 and the one or more data sources is contingent at least in part upon the one or more data sources 120 receiving valid source login credentials from the data source management module 626. In one embodiment, the communication between the connectivity service 220 and the one or more data sources is contingent at least in part upon the data source management module 626 authenticating one or more of a user 112 (e.g. using connectivity login credentials), a client device 106 (e.g. using a trusted MAC address, unique device identifier, etc.) and a query (e.g. using an authentication and/or session token). In one embodiment, the data access module 628 uses the connectivity to access data stored by the one or more data sources 120. In one embodiment, the data access module 628 provides the connectivity and data access using a connectivity library 222.

Figure 7:
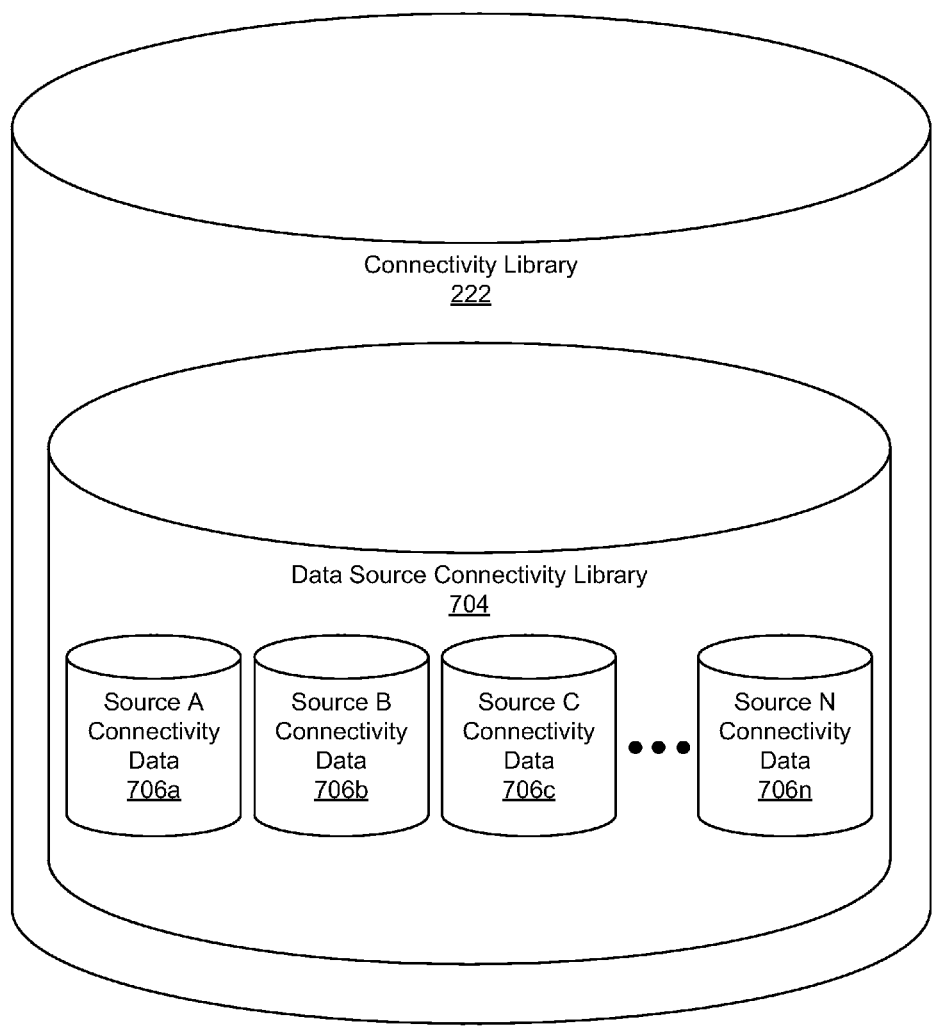
FIG. 7 is a block diagram of a connectivity library according to one embodiment.

Referring now to FIG. 7, an example of a connectivity library is illustrated according to one embodiment. In the illustrated embodiment, the connectivity library 222 includes a data source connectivity library 704 that includes source connectivity data 706*a* . . . 706*n* for accessing one or more data sources. For example, source A connectivity data 706*a* may be connectivity data for connecting to a first on-premise data source 152 (e.g. a relational 106*x* on-premise data source 152), source B connectivity data 706*b* may be connectivity data for connecting to a second on-premise data source 152 (e.g. a NoSQL 108*x* on-premise data source 152), source C connectivity data 706*c* may be connectivity data for connecting to first cloud data source 150 (e.g. a social network 104*a* cloud data source 150) and source N connectivity data 706*n* may be for connecting to a second cloud data source 150 (e.g. a different social network 104*a* cloud data source 150). Source connectivity data 706 may include any information for connecting to and accessing the associated data source 120. For example, in one embodiment, source connectivity data 706 includes one or more of an API for the associated data source 120 and a schema model for the associated data source 120.

In one embodiment, the data access module 628 receives the one or more data sources 120 determined by the data source management module 626, obtains the source connectivity data 706 for the one or more determined data sources, and accesses the one or more determined data sources using the source connectivity data. Source connectivity data 706 is the data and code used to connect to and access the data source 120 associated with that connectivity data 706. For example, source connectivity data 706 may include, but is not limited to, one or more of information about the schema of the data source 120, services exposed by the data source 120, rules for invoking the services exposed by the data source, translation information for using a query language of the data source 120, etc. It should be recognized the preceding are merely examples of the type of information that may be included in source connectivity data 706 and other examples exist and may be included in source connectivity data 706.

The data access module 628 accesses the one or more determined data sources using the source connectivity data. For example, assume the data source management module 626 determines that the application 109's query requires connection and access to a Cassandra database, i.e. a NoSQL data source 108, and a SQL database, i.e. a relational data source 106. In one embodiment, the data access module 628 retrieves the source connectivity data 706 for the Cassandra database and the SQL database and uses the connectivity data to translate (if necessary) the query from the language used by the driver 228 to the language used by the data source 120. For example, assume that the driver 228 is a JDBC driver and the queries use SQL. In one embodiment, the data access module 628 obtains the SQL query from the driver connectivity module 622 (e.g. the driver connectivity module 622 receives a request from the driver 228 using the wire protocol and the driver connectivity module 622 decodes the request to obtain the original SQL query, which it passes to the data access module 628), passes the SQL query to the SQL database, translates the SQL query into Cassandra Query Language using the source connectivity data 706 associated with the Cassandra database and sends the translated query to the Cassandra database.

The data access module 628 may subsequently receive a response (e.g. query results comprising data) from the one or more data sources and translate the response for return to the driver 228. For example, the data access module 628 may receive query results from the SQL database and results from the Cassandra database, translate the results from the Cassandra database into a SQL response using the source connectivity data 706, and the driver connectivity module 622 sends the translated results from the Cassandra database and the results from the SQL database (which may not require translation by the data access module 628) to the driver 228 (e.g. using the wire protocol).

In one embodiment, the data access module 628 may combine results when a query is performed across multiple data sources. For example, in one embodiment, upon receiving the results from the SQL and Cassandra databases in the example above, the data access module 628 translates the Cassandra results into SQL and joins and/or unions the translated Cassandra results with the results from the SQL database, and the driver connectivity module 622 sends the combined results (e.g. using the wire protocol) to the driver 228.

While many of the examples used herein refer to requests (e.g. queries) that fetch data, it should be noted that requests are not merely limited to fetching data from the data source, but may write data to the data source or otherwise manipulate the data structure of the data source (e.g. create or drop a table, create a foreign key relationship, etc.) Accordingly, the data access provided by the data access module 628 is not merely limited to fetching data, but also provides access to the data source 120 to create, modify and delete data stored by the data source 120 and create, modify and delete the data structure of the data source 120.

In some embodiments, the connectivity service 220 may beneficially adapt to the ever changing data access landscape. For example, assume a new data source 120 (e.g. a new NoSQL data source 108) is created; in one embodiment, the connectivity service 220 may provide access to that new data source to all users of the connectivity service 220 by generating source connectivity data 706 for the new data source 120 and adding that source connectivity data to the connectivity library 222. In some embodiments, the application 109 is able to access the new data source 120 with little to no modification of the application's code 109 thereby reducing the costs and difficulties that have previously been associated with adding support for a new data source 120 to an application and eliminating "lock-in," i.e., being beholden to a data source because to switch would be too expensive.

Similarly, in some embodiments, connectivity service 220 may beneficially adapt to the ever changing data access landscape by managing data source updates. For example, assume a data source 120 (e.g. a new NoSQL data source 108) updates its API; in one embodiment, the connectivity service 220 may update the source connectivity data 706 associated with that data source thereby providing the updated API to the users of the connectivity service 220 thereby eliminating the need for updating each application 109 individually to support the updated API and, therefore, reducing the cost associated therewith. In some embodiments, little to no modification to the application's 109 code is required when adding, removing or updating data sources 120. Additionally, in one embodiment, the use of a single driver 228 to access the connectivity service 220, which provides connectivity to the one or more data sources, may reduce the number of drivers the client device 106 must maintain and update.

In one embodiment, the data access module 628 passes the query, which may have been translated into one or more different query languages, to the one or more data sources 120. In one embodiment, the data access module 628 passes the response(s) from the one or more data sources, which may have been translated into a common query language (e.g. SQL), to the driver communication module 622. In one embodiment, the data access module 628 stores the response(s) from the one or more data sources in memory 404 (or any other non-transitory storage medium communicatively accessible). The other modules of the connectivity service 220 module including, e.g., the driver communication module 622, may retrieve the response(s) from the one or more data sources by accessing the memory 404 (or other non-transitory storage medium). In some embodiments, the data access module 628 stores a response temporarily. For example, in some embodiments, the data access module 628 associates a response with a time to live and when the response is not fetched by the driver communication module 622 and sent to the driver 228 before the time to live period expires, the data access module 28 deletes the response to free up memory 404 and other system resources.

Referring again to FIG. 5, the optional data quality module 524 includes code and routines for providing data quality assurance. In one embodiment, the data quality module 524 is a set of instructions executable by the processor 402. In another embodiment, the data quality module 524 is stored in the memory 404 and is accessible and executable by the processor 402. In either embodiment, the data quality module 524 is adapted for cooperation and communication with the processor 402, other components of the connectivity server 122 and other components of the connectivity service 220 module.

The data quality module 524 provides data quality assurance. Examples of data quality assurance may include one or more of data profiling (e.g. assessing quality of data), data standardization (e.g. applying one or more rules so that new and/or existing data complies with the one or more rules), matching and/or linking (e.g. aligning similar but slightly different records and removing duplicates in data such as when 'Bill' and 'William' are the same individual and/or live in the same household), geocoding (e.g. correcting address data to comply with postal standards), monitoring (e.g. comparing assessments over time to track quality of data over time), etc.

The optional caching module 526 includes code and routines for caching one or more of a query and data obtained from one or more data sources 120 using the connectivity service 220. In one embodiment, the caching module 526 is a set of instructions executable by the processor 402. In another embodiment, the caching module 526 is stored in the memory 404 and is accessible and executable by the processor 402. In either embodiment, the caching module 526 is adapted for cooperation and communication with the processor 402, other components of the connectivity server 122 and other components of the connectivity service 220 module.

In some embodiments, the connectivity service 220 does not cache information. For example, in some embodiments, the connectivity service 220 may lack a caching module 526 and the connectivity server 122 does not cache information in the memory 404 or other storage device (not shown). In some embodiments, the connectivity service 220 may cache information associated with one or more of a query and a result. For example, in some embodiments, the connectivity service 220 includes a caching module 526 and the connectivity server 122 includes a cache (not shown) in the memory 404 or other storage device (not shown).

In one embodiment, the caching module 526 may cache information associated with a query. For example, in one embodiment, queries may be stored for reuse as virtual views. In one embodiment, the caching module caches results of a query, i.e., data obtained from one or more data sources 120 in response to a query. Caching results of a query may provide for a reduction in the amount of time taken to retrieve that data when there is a subsequent query for that data. In some embodiments, the connectivity server 122 caches data retrieved from one or more data sources 120 and passed to a client device 106 for subsequent use/retrieval.

In some embodiments, as discussed above, the caching module 526 controls caching at the connectivity server 122 (or DAS 132 thereof). In some embodiments, the caching module 526 may control caching between the user device 106 and the connectivity server 122 and/or between the connectivity server 122 and the data source 120. For example, assume the connection between the client device 106 and the connectivity server 122 or the connectivity server 122 and the data source 120 utilizes an HTTP connection; in one embodiment, the caching module 526 may manage (e.g. add, remove, modify, etc.) HTTP headers associated with caching (e.g. last-modified, etag, expires, max-age, public and private, etc.) by intermediary servers (not shown).

The optional bulk import/export module 528 includes code and routines for providing one or more of bulk import to and bulk export from a data source 120. In one embodiment, the bulk import/export module 528 is a set of instructions executable by the processor 402. In another embodiment, the bulk import/export module 528 is stored in the memory 404 and is accessible and executable by the processor 402. In either embodiment, the bulk import/export module 528 is adapted for cooperation and communication with the processor 402, other components of the connectivity server 122 and other components of the connectivity service 220 module.

In one embodiment, the bulk import/export module 528 provides bulk import to one or more data sources 120. For example, in one embodiment, the bulk import/export module 528 receives a file from the client device 106 and loads data from the file to one or more data sources 120. In another example, the driver 228 sends a large stream of data to the connectivity service 220 and the bulk import/export module 528 along with the data access module 628 loads the stream of data into one or more data sources 120. In some embodiments, the stream of data may be sent to the connectivity service 220 in pieces to make the import/export more manageable. For example, in one embodiment, the driver-side communication module (not shown) of the driver 228 divides a data stream into chunks of data and sends the chunks of data to the connectivity service 220 at a metered rate.

In one embodiment, the bulk import/export module 528 provides batching of queries (e.g. sending a batch of multiple queries). In one embodiment, the bulk import/export module 528 provides transactionality (e.g. when one statement in a batch of queries that is identified as a single transaction does not execute, any changes to the database from that transaction are rolled back as if none of the queries in the transaction had been performed).

In one embodiment, the bulk import/export module 528 provides for bulk export from one or more data sources 120. For example, in one embodiment, the bulk import/export module 528 receives a file from the data source 120 passes the data file to client device 106. In another example, the bulk import/export module 528 receives data from the one or more data sources 120 and generates a file for bulk export, which is transmitted to the client device 106. In yet another example, a data source 120 returns a large stream of data to the connectivity service 220 and the bulk import/export module 528 along with the driver communication module 622 passes the stream of data to the driver 228. In some embodiments, the stream of data may be sent by the driver communication module 622 in pieces to make the import/export more manageable. For example, in one embodiment, the driver communication module 622 divides a data stream into chunks of data and sends the chunks of data to the driver 228 at a metered rate.

The optional design tools module 530 includes code and routines for providing one or more design tools. In one embodiment, the design tools module 530 is a set of instructions executable by the processor 402. In another embodiment, the design tools module 530 is stored in the memory 404 and is accessible and executable by the processor 402. In either embodiment, the design tools module 530 is adapted for cooperation and communication with the processor 402, other components of the connectivity server 122 and other components of the connectivity service 220 module.

The design tools module 530 provides one or more design tools. Examples of design tools include, but are not limited to a schema browser for browsing the schema of a data source 120, a query editor for creating and testing queries, a query/view manager for creating, modifying and deleting named queries and/or views, etc.

The optional change data capture module 532 includes code and routines for tracking or capturing changes to the data in the data sources 120. In one embodiment, the change data capture module 532 is a set of instructions executable by the processor 402. In another embodiment, the change data capture module 532 is stored in the memory 404 and is accessible and executable by the processor 402. In either embodiment, the change data capture module 532 is adapted for cooperation and communication with the processor 402, other components of the connectivity server 122 and other components of the connectivity service 220 module.

The change data capture module 532 tracks or captures changes to the data in the one or more data sources 120. Types of changes to the data in the one or more data sources 120 may include one or more of the creation, deletion or modification of tables, columns, field types, values stored in a field, etc. The type(s) of changes tracked or captured by the change data capture module 532 depend on the embodiment.

For example, in some embodiments, the connectivity service 220 may include a caching module 526 and the change data capture module 532 may track changes in data to determine, or provide information to the caching module 526 to determine, whether data cached as a previous result is stale and out of date. Alternatively, the change data capture module 532 may capture the change and pass the change to the caching module 526 to update the cached information.

In some embodiments, the change data capture module 532 provides a notification to an application 109 that data has changed. Depending on the embodiment, the notification may be a push type notification that the change data capture module 532 sends to the application 109 when a specified change event occurs or pull type notification where the change data capture module 532 tracks specified change events and the application 109 periodically requests a notification of any specified change events in a given time period.

In another example, in some embodiments, the connectivity service 220 may include a mapping module 534 (discussed below) for mapping a schema of one or more data sources 120 to a relational schema and the change data capture module 532 tracks the addition and deletion of tables and columns and the modification of field types which may impact the mapping and communicate with the mapping module 534 to update the mapping or prompt a user to update the mapping accordingly. It should be recognized that the preceding were merely examples of types of changes that may be tracked or captured and potential reasons for doing so and that other changes and reasons may exist.

The optional mapping module 534 includes code and routines for mapping one or more data sources. In one embodiment, the mapping module 534 is a set of instructions executable by the processor 402. In another embodiment, the mapping module 534 is stored in the memory 404 and is accessible and executable by the processor 402. In either embodiment, the mapping module 534 is adapted for cooperation and communication with the processor 402, other components of the connectivity server 122 and other components of the connectivity service 220 module.

The mapping module 534 provides mapping of a data source 120. The mapping may be automatic. For example, in one embodiment, the mapping module 534 automatically maps a NoSQL data source 108 to a relational data source 106 (e.g. by flattening or normalizing nested objects). In another embodiment, the mapping may be manual. For example, in one embodiment, the mapping module 534 provides one or more graphical user interfaces (GUIs) which may present to the user the schema of a data source and allow the user to generate a customized schema mapping or model of the data source 120.

In some embodiments, the mapping generated by the mapping module 534 may be source connectivity data 706 used by the data access module 628. For example, in one embodiment, to access a Mongo DB database, (i.e. a NoSQL data source 108), the data access module 628 obtains the query (e.g. a SQL query) from the driver communication module 622, obtains the source connectivity data 706 including general connectivity information (e.g. the MongoDB API) and user specific connectivity information (e.g. a mapping of the MongoDB table(s) used by the application 109) and translates queries and responses accordingly.

The optional billing module 536 includes code and routines for generating billing information. In one embodiment, the billing module 536 is a set of instructions executable by the processor 402. In another embodiment, the billing module 536 is stored in the memory 404 and is accessible and executable by the processor 402. In either embodiment, the billing module 536 is adapted for cooperation and communication with the processor 402, other components of the connectivity server 122 and other components of the connectivity service 220 module.

The connectivity provided by the connectivity service 220 module may be monetized to generate revenue, for example, to pay for adding connectivity to additional data sources 120, maintaining the connectivity server(s) 120, etc.

In one embodiment, billing may be based at least in part on services provided by the connectivity service 220 module. For example, a first price may be charged to a user for basic connectivity and a second price may be charged to a user when data quality, bulk import/export, mapping, design tools, etc. are used or made available for use.

In one embodiment, billing may be based at least in part on a period of time. In one embodiment, the period may be a subscription period. For example, the billing may be based on a daily, weekly, monthly, yearly, etc. subscription period. In one embodiment, the period may be based on the duration of connectivity. For example, the billing may be based on the duration of connectivity between an application 109 and the one or more data sources 120 provided by the connectivity service 220.

In one embodiment, the billing may be based at least in part on a number of sources. For example, in one embodiment, the bill may increase when the number of data sources increases. In one embodiment, the bill may be based at least in part on the number of times connectivity is provided. For example, billing is per connectivity session. In one embodiment, the billing may be based at least in part on resource consumption. For example, billing is per byte, kilobyte, megabyte, etc. of data obtained using the connectivity provided by the connectivity service 220.

Example Methods

Figure 8:
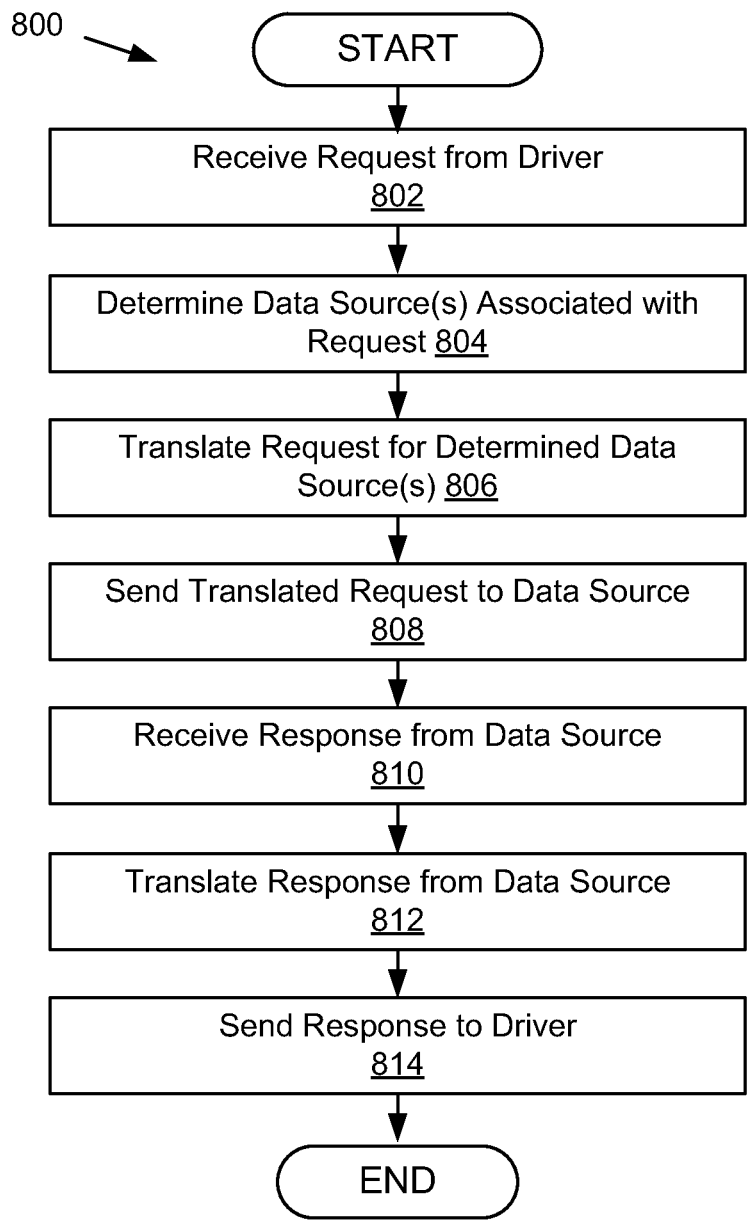
FIG. 8 is a flowchart of an example method for connectivity as a service according to one embodiment.

FIG. 8 depicts method 800 performed by the system described above in reference to FIGS. 1-7. In some embodiment, the method 800 is performed subsequent to the data source management module 626 authenticating one or more of the requesting user 112 and the requesting client device 106. The method 800 begins at block 802. At block 802, the driver communication module 622 receives a request (e.g. a query) from a driver 228. At block 804, the data source management module 626 determines the one or more data sources 120 associated with the request received at block 802. At block 806, the data access module 628 translates the request for the one or more data sources 120 determined at block 804. At block 808, the data access module 628 sends the translated request to the one or more data sources determined at block 804. At block 810, the data access module 628 receives a response (e.g. query results) from the one or more data sources. At block 812, the data access module 628 translates the response from the one or more data sources and, at block 814, the driver communication module 622 sends the translated response to the driver 228.

Figure 9:
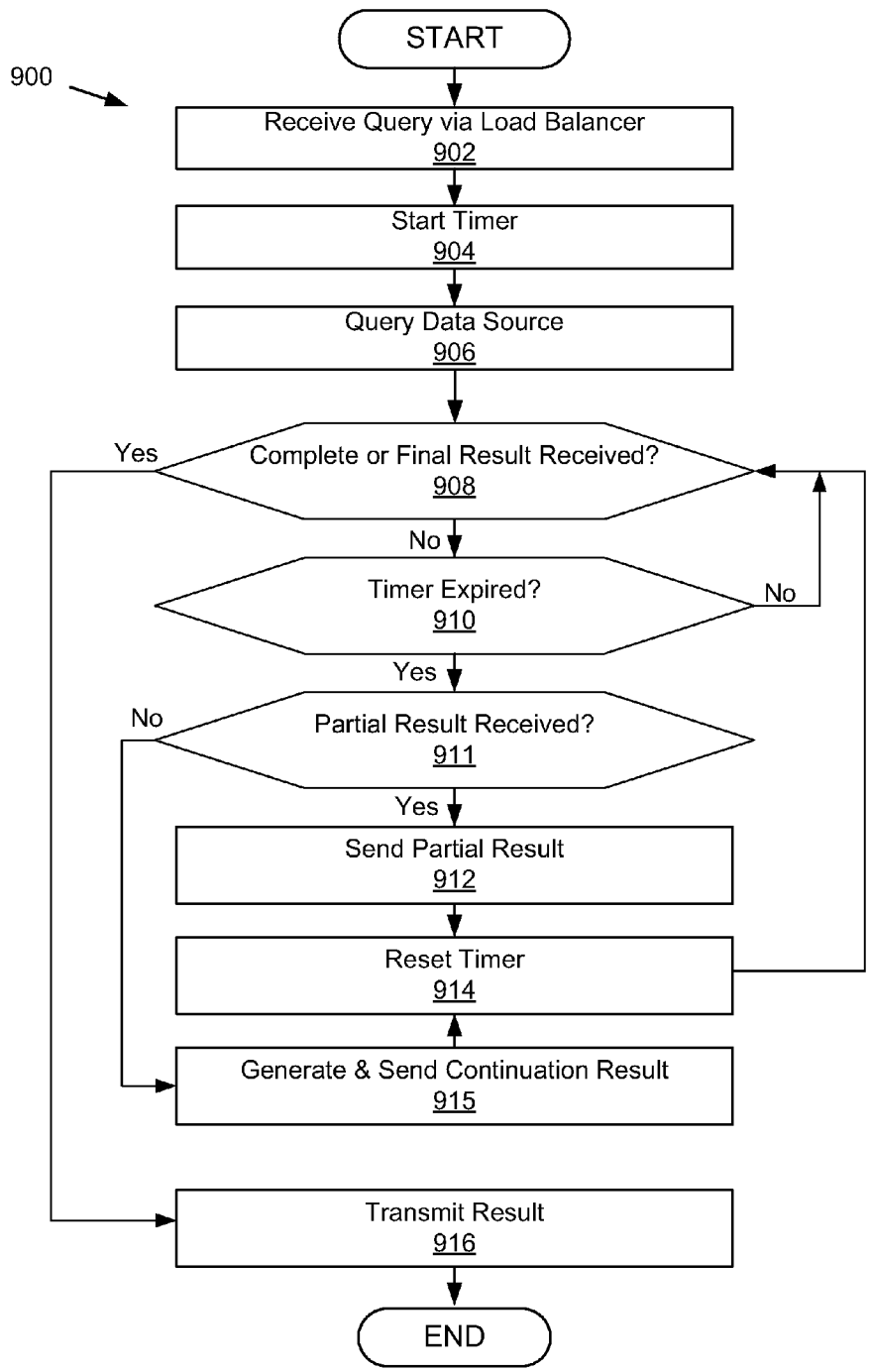
FIG. 9 is flowchart of an example method for preventing load balancer timeout while providing connectivity as a service according to one embodiment.

FIG. 9 depicts method 900 for preventing load balancer 130 timeout, which may be performed by the system described above in reference to FIGS. 1-7. The method 900 begins at block 902. At block 902, the driver communication module 622 receives a query from the application 109 via a load balancer 130. At block 904, the driver communication module 622 starts a timer. At block 906, the data access module 628 queries the data source 120. At block 908, the driver communication module 622 determines whether the data access module 628 has received complete or final results for the query.

When the driver communication module 622 determines that the data access module 628 has received complete or final results of the query (908—Yes), the method 900 continues at block 916. At block 916, the driver communication module 622 transmits the complete or final results to the driver 228 and the method 900 ends. When the driver communication module 622 determines that the data access module 628 has not received the complete or final results of the query (908—No), the method 900 continues at block 910.

At block 910, the driver communication module 622 determines whether the timer has expired. When the communication module 622 determines that the timer has not expired (910—No), the method 900 continues at block 908. In one embodiment, blocks 908 and 910 may be repeated until the driver communication module 622 determines that the data access module 628 has received the complete or final results of the query (908—Yes) or until the driver communication module 622 determines that the timer has expired (910—Yes). When the driver communication module 622 determines that the timer has expired (910—Yes), the method 900 continues at block 911.

At block 911, the driver communication module 622 determines whether the data access module 628 has received a partial result. When the driver communication module 622 determines that the data access module 628 has received a partial result (911—Yes), the method 900 continues at block 912. At block 912, the driver communication module 622 sends the partial result to the driver 228. For example, the driver communication module 622 sends the partial results with a token indicating that more results are expected. After block 912, the method continues at block 914.

When driver communication module 622 determines that the data access module 628 has not received a partial result (911—No), the method 900 continues at block 915. At block 915, the driver communication module 622 generates and sends a continuation result to the driver 228. For example, the driver communication module 622 generates a message that includes no results and a token indicating that more results are expected. After block 915, the method continues at block 914.

At block 914, the driver communication module 622 resets the timer. The method 900 then continues at block 908. In one embodiment, one or more of blocks 908, 910, 911, 912, 914 and 915 may be repeated until the driver communication module 622 determines that the data access module 628 has received the complete or final results of the query (908—Yes) and the method 900 continues at block 916. At block 916, the driver communication module 622 transmits the complete or final results to the driver 228 and the method 900 ends.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:
1. A computer-implemented method comprising:
    establishing, using one or more processors, a first connection between a standard data access application program interface (API) based driver and a connectivity service via a load balancer, wherein the connectivity service is able to communicate with a plurality of heterogeneous data sources to obtain a response to a request;
    receiving, using the one or more processors, a first request for a first result at the connectivity service from the standard data access API based driver via a network;
    setting, at the connectivity service, a first timer responsive to receiving the first request;
    determining, using the one or more processors, from the first request, a first set of data sources including a first data source and a second data source from the plurality of heterogeneous data sources associated with the first request,
        wherein the first data source is a first type of data source from a group of types including a relational data source, a non-relational data source, a big data source, a customer engagement source, and a business operation source from the plurality of heterogeneous data sources,
        wherein the second data source is a second type of data source from the group of types including the relational data source, the non-relational data source, the big data source, the customer engagement source, and the business operation source from the plurality of heterogeneous data sources, and
        wherein the first type of data source is different from the second type of data source;
    determining, using the one or more processors, that the received first request is to be translated for the first data source and the second data source in the first set;
    establishing, using the one or more processors, a second connection between the connectivity service and the first set of data sources determined from the first request;
    sending a second set of requests, via the network, to the first set of data sources, the first set of data sources performing actions based on the second set of requests, wherein responsive to the determination that the first request is to be translated for the first data source and the second data source, the second set of requests includes a first portion that is translated from the first request for the first data source and a second portion translated for the second data source in the first set;
    determining, by the connectivity service, that the first result is incomplete and the first timer has expired, wherein the expiration of the first timer occurs prior to a timeout of the load balancer;
    sending, by the connectivity service, a continuation message to the standard data access API based driver based on the determination that the first result is incomplete and the expiration of the first timer; and
    resetting the first timer responsive to sending the continuation message.

2. The computer-implemented method of claim 1 including:
    receiving data from the first set data sources; and
    sending the received data to the standard data access API based driver,
    wherein the second request includes a request for data received from the first set of data sources and the action performed by the first set of data sources includes a query of the first set of data sources based on the second request.

3. The computer-implemented method of claim 1, wherein the standard data access API based driver and connectivity service communicate using a wire protocol.

4. The computer-implemented method of claim 1, wherein the first connection between the standard data access API based driver and connectivity service is stateless and the standard data access API based driver and connectivity service communicate using a wire protocol, the wire protocol including one or more tokens including state information.

5. The computer-implemented method of claim 1, wherein the standard data access API based driver and connectivity service communicate using a wire protocol, the wire protocol including a binary protocol, the binary protocol compressing, at the connectivity service, data received from the first set of data sources, wherein the received data sent to the standard data access API based driver is compressed data.

6. The computer-implemented method of claim 1, wherein the first data source and the second data source are heterogeneous.

7. The computer-implemented method of claim 1, wherein the first data source and the second data source are heterogeneous, the first data source having a first class and the second data source having a second class different from the first class, wherein the first and second class are each one of a big data source, a social network source, a relational source, a NoSQL source, a customer engagement source, a business operations source and an other source.

8. The computer-implemented method of claim 1, wherein determining that the first result is incomplete includes determining whether at least a portion of the requested data has been received prior to an expiration of the first timer and wherein sending a continuation message based on the determination that the first request is incomplete further comprises:
   responsive to determining that at least a portion of the requested data has been received, sending the at least a portion of the requested data to the standard data access API based driver and resetting the first timer;
   responsive to determining that at least a portion of the requested data has not been received, sending the continuation message without the requested data to the standard data access API based driver and resetting the first timer; and
   wherein the sending of the continuation message without the requested data and the sending of at least a portion of the requested data resets a second timer at the load balancer, the second timer associated with a timeout period for the load balancer.

9. The computer-implemented method of claim 1, wherein the connectivity service simultaneously is connected to another driver for receiving data requests from the another driver and sending, to the another driver, data requested by the another driver and received, by the connectivity service, from a second set from the plurality of heterogeneous data sources.

10. The computer implemented method of claim 1, wherein the standard access API based driver uses one of an Open Database Connectivity (ODBC), a Java Database Connectivity (JDBC), and an Open Data Protocol (OData).

11. A system comprising:
   a processor;
   a memory storing instructions that, when executed, cause the system to:
      establish a first connection between a standard data access application program interface (API) based driver and a connectivity service via a load balancer, wherein the connectivity service is able to communicate with a plurality of heterogeneous data sources to obtain a response to a request;
      receive, at the connectivity service, a first request for a first result from the standard data access API based driver via a network;
      set, at the connectivity service, a first timer responsive to receiving the first request;
      determine from the first request, a first set of data sources including a first data source and a second data source from the plurality of heterogeneous data sources associated with the first request,
      wherein the first data source is a first type of data source from a group of types including a relational data source, a non-relational data source, a big data source, a customer engagement source, and a business operation source from the plurality of heterogeneous data sources,
      wherein the second data source is a second type of data source from the group of types including the relational data source, the non-relational data source, the big data source, the customer engagement source, and the business operation source from the plurality of heterogeneous data sources, and
      wherein the first type of data source is different from the second type of data source;
      determine that the received first request is to be translated for the first data source and the second data source in the first set;
      establish a second connection between the connectivity service and the first set of data sources determined from the first request;
      send a second set of requests, via the network, to the first set of data sources, the first set of data sources performing actions based on the second set of requests, wherein responsive to the determination that the first request is to be translated for the first data source and the second data source, the second set of requests includes a first portion that is translated from the first request for the first data source and a second portion translated for the second data source in the first set;
      determine that the first result is incomplete and the first timer has expired, wherein the expiration of the first timer occurs prior to a timeout of the load balancer;
      send, by the connectivity service, a continuation message to the standard data access API based driver based on the determination that the first result is incomplete and the expiration of the first timer; and
      reset the first timer responsive to sending the continuation message.

12. The system of claim 11, the memory further storing instructions that, when executed cause the system to:
   receive data from the first set of data sources; and
   send the received data to the standard data access API based driver,
   wherein the second request includes a request for data received from the first set of data sources and the action performed by the first set of data sources includes a query of the first set of data sources based on the second request.

13. The system of claim 11, wherein the standard data access API based driver and connectivity service communicate using a wire protocol.

14. The system of claim 11, wherein the first connection between the standard data access API based driver and connectivity service is stateless and the standard data access API based driver and connectivity service communicate using a wire protocol, the wire protocol including one or more tokens including state information.

15. The system of claim 11, wherein the standard data access API based driver and connectivity service communicate using a wire protocol, the wire protocol including a binary protocol, the binary protocol compressing, at the connectivity service, data received from the first set of data sources, wherein the received data sent to the standard data access API based driver is compressed data.

16. The system of claim 11, wherein the first data source and the second data source are heterogeneous.

17. The system of claim 11, wherein the first data source and the second data source are heterogeneous, the first data source having a first class and the second data source having a second class different from the first class, wherein the first and second class are each one of a big data source, a social network source, a relational source, a NoSQL source, a customer engagement source, a business operations source and an other source.

18. The system of claim 11, wherein the instructions to determine that the first result is incomplete include instructions for determining whether at least a portion of the requested data has been received prior to an expiration of the first timer and wherein the instructions to send the continuation message based on the determination that the first request is incomplete further cause the system to:
- responsive to determining that at least a portion of the requested data has been received, send the at least a portion of the requested data to the standard data access API based driver and reset the first timer;
- responsive to determining that at least a portion of the requested data has not been received, send the continuation message without the requested data to the standard data access API based driver and reset the first timer; and
- wherein the sending of the continuation message without the requested data and the sending of at least a portion of the requested data resets a second timer at a load balancer, the second timer associated with a timeout period for the load balancer.

19. The system of claim 11, wherein the standard access API based driver uses one of an Open Database Connectivity (ODBC), a Java Database Connectivity (JDBC), and an Open Data Protocol (OData).

20. A system comprising:
a processor;
a memory storing instructions that, when executed, cause the system to:
- receive, at a standard data access application program interface (API) based driver, a first request for a first result from an application via a network;
- establish a first connection between the standard data access API based driver and a connectivity service via a load balancer, wherein the connectivity service is able to communicate with a plurality of heterogeneous data sources,
- wherein the connectivity service sets a first timer responsive to receiving the first request and determines from the first request, a first set of data sources including a first data source and a second data source from the plurality of heterogeneous data sources associated with the first request,
- wherein the first data source is a first type of data source from a group of types including a relational data source, a non-relational data source, a big data source, a customer engagement source, and a business operation source from the plurality of heterogeneous data sources,
- wherein the second data source is a second type of data source from the group of types including the relational data source, the non-relational data source, the big data source, the customer engagement source, and the business operation source from the plurality of heterogeneous data sources, and
- wherein the first type of data source is different from the second type of data source;
- wherein the connectivity service determines that the received first request is to be translated for the first data source and the second data source in the first set and sends a second set of requests, via the network, to the connectivity service, the connectivity service establishing a second connection with the first set of data sources, the first set of data sources performing actions based on the second set of requests, wherein response to the determination that the first request is to be translated for the first data source and the second data source, the second set of requests includes a first portion that is translated from the first request for the first data source and a second portion translated for the second data source in the first set;
- responsive to a determination that the first result is incomplete and the first timer has expired, wherein the expiration of the first timer occurs prior to a timeout of the load balancer, receiving a continuation message at the standard data access API based driver from the connectivity service, the first timer reset based on transmission of the continuation message; and
- receive, at the standard data access API based driver, data from the first set of data sources, via the network, responsive to the second set of requests including a request for the data.

* * * * *